Figure 1:
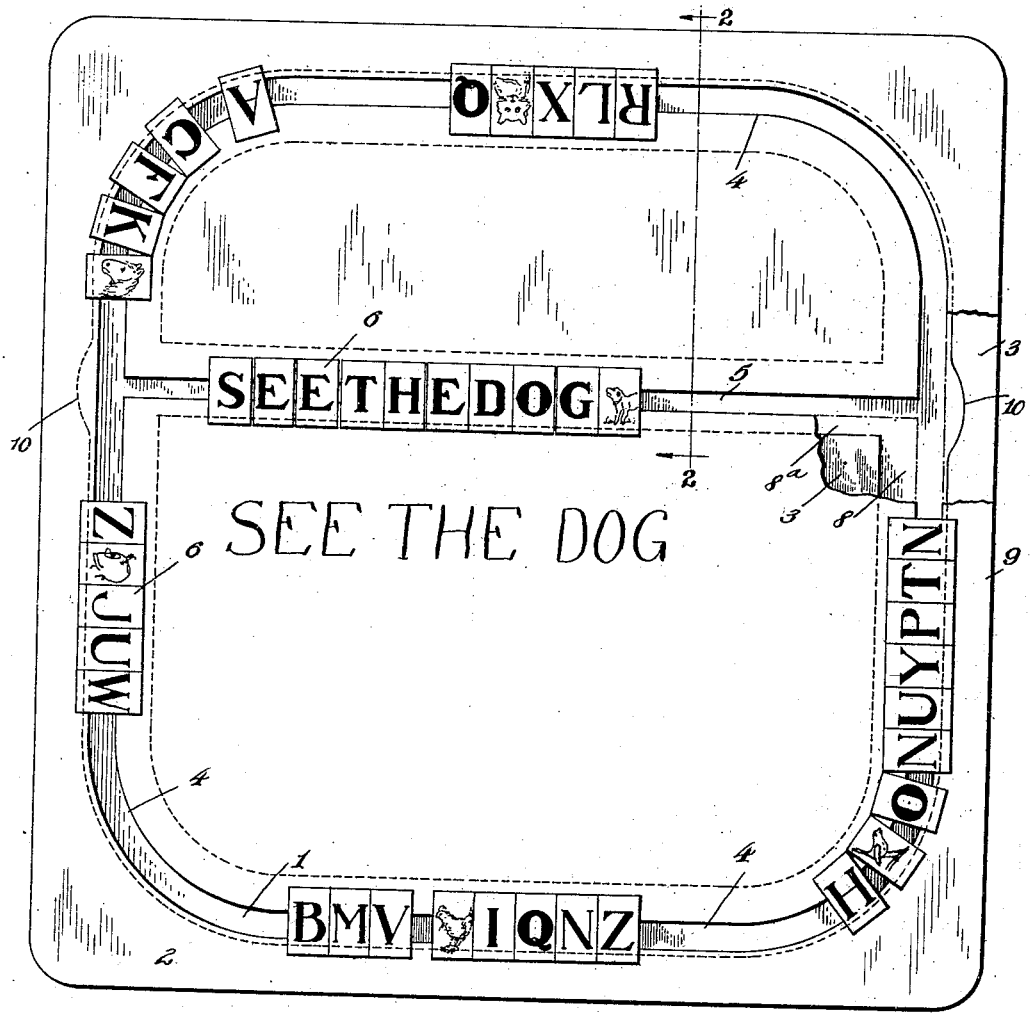

J. H. FOX.
EDUCATIONAL DEVICE.
APPLICATION FILED FEB. 4, 1915.

1,240,556.

Patented Sept. 18, 1917.

Witnesses:
R. L. Druck
H. J. Duvall

Inventor:
John H. Fox
By Hull and Smith
Attys.

UNITED STATES PATENT OFFICE.

JOHN H. FOX, OF BEREA, OHIO.

EDUCATIONAL DEVICE.

1,240,556.  Specification of Letters Patent.  Patented Sept. 18, 1917.

Application filed February 4, 1915. Serial No. 6,030.

*To all whom it may concern:*

Be it known that I, JOHN H. Fox, a citizen of the United States, residing at Berea, in the county of Cuyahoga and State of Ohio, have invented a certain new and useful Improvement in Educational Devices, of which the following is a full, clear, and exact description, reference being had to the accompanying drawings.

This invention relates to improvements in what are known as educational boards that are useful in instructing children in the use of letters and simple words and in the formation of sentences, and which comprise, usually a board having a continuous or endless storage slot and one or more branch slots which extend therefrom and within which are slidably supported a plurality of buttons that bear letters of the alphabet, words or any other desired inscription, and that are capable of being moved along the storage slot and into the branch slots, enabling a child or instructor to select any of the buttons and arrange them within the branch slot in a manner to form words or sentences.

My invention has for its object the provision of a device of the aforesaid character that is very durable; that is comparatively simple of construction and economical of production; that is convenient of manipulation; wherein the buttons are prevented from entering the branch slot except when right side up; and that has its opposed faces equipped each with a set of buttons, those on one face bearing the letters of the alphabet, or any other desired matter, while those on the other side may contain short words, pictures, etc. I am aware of the fact that "educational" boards wherein both sides are utilized are in use at the present time, and I lay no claim to this particular feature as a part of my invention, except as relates to certain novel structural details of my improved board whereby this end is accomplished.

A further and very important object comprehended by my invention is the provision of a writing surface, such as a blackboard, that has combined with it the features of the educational board, whereby a child is enabled to copy the matter "set up" within the branch slot of the board, thereby greatly increasing the usefulness of the article as a means of instruction and manual and mental development.

In the accompanying drawing I have illustrated a board wherein the foregoing objects are attained, and while I will proceed to describe the same in detail, I wish to be understood as not limiting myself to the structural details thereof further than is required by the terms of the annexed claims and is rendered necessary by the prior state of the art.

Figure 2:
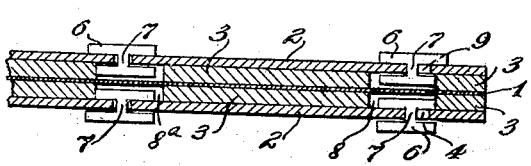
Figure 3:
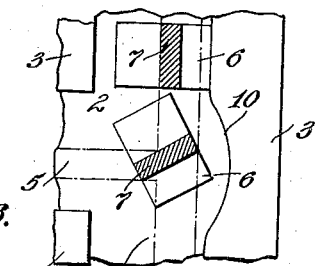

In the drawing, wherein similar reference characters are used to designate corresponding parts throughout the different views, Figure 1 represents a face view of my improved educational board; Fig. 2 is a section on the line 2—2 of Fig. 1; and Fig. 3 shows an enlargement of a portion of Fig. 1, the view embracing that part of the aforesaid figure adjacent one end of the branch slot and where said slot opens into the storage slot, the view being on an enlarged scale, with the buttons in horizontal section, and serving to illustrate the manner in which the buttons are turned from the storage slot into the branch slot.

The board comprises a flat supporting plate 1, that is preferably of metal, and in the embodiment of my invention disclosed herein, there is spaced from each of the opposed surfaces of the supporting plate, a face plate 2, preferably of a tough fiber and having its exposed surface blackened and finished in a manner that will render it suitable for use as a slate or blackboard. Instead of being blackened, the face plate may be white and treated so that a lead pencil may be used for marking thereon, and from which the marks may be easily erased. Fillers 3, which may be of a heavy cardboard, are used to space the face plates from the supporting plate, and the parts may be secured together by any suitable means, such as glue or other adhesive substance, or they may be connected by brads or the like, if desired. Each of the face plates is provided with an endless storage slot 4, and a narrower branch slot 5 that extends transverse the board and opens, at its opposite ends, into the storage slot.

6 represents buttons, each of which comprises a pair of opposed heads that are connected by a neck 7 that is rectangular in cross section and is of a width less than the width of the branch slot 5, and is of a length greater than the width of the storage slot 4. Each button may bear a letter, or other inscription, as already explained. The fillers 3 are provided with slots 8 and 8ª, which are coincident with the slots 4 and 5, respectively, of the face plate, and are amply wide to permit freedom of movement of the inner heads of the buttons.

It will be observed that the inner heads of the buttons are shorter than the outer heads and that they are off center with respect to the necks 7. Also that the slots 8 of the fillers are correspondingly offset transversely with respect to the storage slots of the face plates, and that one end of the inner button heads, preferably the shorter, reposes or moves in very close proximity to the outer sides of the aforesaid slots 8. In this manner the side of each filler slot 8 serves as a guide for the buttons which are reciprocable therein, and prevents said buttons from turning within the storage slot of the respective face plate. Without such means of guidance, the buttons might turn diagonally across the slots and the necks thereof would be liable to bind between the edges of the slot and interfere somewhat with their sliding. Adjacent each end of the branch slot 5, the side of the filler slot 8 is notched at 10, to allow the buttons to be turned at this point and moved into the branch slot of the face plate, as clearly illustrated in Fig. 3.

Attention is also directed to the fact that the transverse slot 8ª of each of the fillers is offset laterally with respect to the branch slot 5 of the corresponding face plate, and that the buttons 6 are permitted to enter such branch slot, only when the shorter ends of their inner heads are adjacent the rear side of the slot 8ª. This arrangement establishes a constant and fixed relation between the buttons and the branch slot of each face plate, and prevents them entering said slot in any but an upright position; and the characters are printed upon the buttons with this feature in mind so that children are unable to get the character assembled up side down within the branch slot, and thus confuse them in regard to the appearance of certain of the letters, etc.

In the use of the board, words or sentences may be compiled within the branch slot 5, by selecting buttons bearing appropriate letters, from the storage slot and moving them into the branch slot from either end, in proper order; and the matter contained upon such buttons may then be copied upon the blackboard or writing surface of the adjacent face plate.

Having thus described my invention what I claim is:—

1. A device of the character set forth comprising a face plate having a storage slot and a branch slot that extends therefrom, buttons comprising opposed heads connected by necks that are guided within the slots of the face plate, one head of each button having a flattened portion, and a guide having an edge wherewith the flattened portions of the button heads engage as the buttons traverse the storage slot and are thereby prevented from turning, said edge being interrupted adjacent the entrance to the branch slot so that the buttons may turn as they enter the same.

2. A device of the character set forth comprising a plate having a storage slot and a narrower branch slot that extends therefrom, buttons slidable within the aforesaid slots and comprising each a pair of opposed heads that are connected by a neck that is adapted to be received by either of the slots of the plate, said neck being in cross-section of a width less than the width of the branch slot and of a length greater than the width of the storage slot, one head of each button having a flattened portion, and a guide for engagement by the flat portions of the button heads whereby the buttons are prevented from turning within the storage slot except when adjacent the end of the aforesaid branch slot.

3. A device of the character set forth comprising a supporting plate, a face plate parallel to and spaced from the supporting plate, a filler between the supporting plate and the face plate, the face plate having a storage slot and a narrower branch slot that extends therefrom, the filler also having slots that are coincident with and wider than the slots in the face plate and buttons slidable within the aforesaid slots and comprising each a pair of opposed heads that are connected by a rectangular neck that is adapted to be received by either of the slots of the face plate, one of the heads of each button having a flattened portion, one side of the slots of the filler constituting guides for engagement by the flattened portions of the buttons whereby the buttons are prevented from turning within the slots of the face plates except when adjacent the end of the aforesaid branch slot.

4. A device of the character set forth comprising a supporting plate, a face plate parallel to and spaced from the supporting plate, a filler between the supporting plate and the face plate, the face plate having a storage slot and a branch slot that extends therefrom, the filler having a slot coincident with each and wider than the corresponding slot of the face plate, the slot of the filler that is beneath the branch slot of the face plate being offset laterally with respect to said branch slot, and buttons comprising each a pair of opposed heads that are connected by a neck, the inner head of each button being off center with respect to its neck, the shorter end of said inner head being arranged to engage one side of the aforesaid filler slot, thereby to prevent the buttons from entering the branch slot of the face plate except when in a fixed relation thereto, as and for the purpose specified.

5. A device of the character set forth comprising a plate having a storage slot and a branch slot that extends therefrom, buttons slidable within the aforesaid slots and comprising each a pair of opposed heads that are connected by a neck that is adapted to be received by either of the slots of the plate, one of the heads of each button being off-center with respect to its neck, and a guide extending along the slots for engagement by the shorter ends of the last mentioned heads whereby the buttons are prevented from entering the branch slot except when in a fixed relation thereto.

In testimony whereof, I hereunto affix my signature in the presence of two witnesses.

JOHN H. FOX.

Witnesses:
BRENNAN B. WEST,
HUGH B. MCGILL.

Copies of this patent may be obtained for five cents each, by addressing the "Commissioner of Patents, Washington, D. C."